INVENTOR.
CARL E. CHAMPION
BY [signature]
ATTORNEY

Sept. 29, 1959 C. E. CHAMPION 2,907,020

DIGI-GRAPHIC RECORDER

Filed Oct. 10, 1955 2 Sheets-Sheet 2

INVENTOR.
CARL E. CHAMPION

BY [signature]

ATTORNEY

United States Patent Office 2,907,020

Patented Sept. 29, 1959

2,907,020

DIGI-GRAPHIC RECORDER

Carl E. Champion, Hollywood, Calif., assignor to Bendix Aviation Corporation, North Hollywood, Calif., a corporation of Delaware Application October 10, 1955, Serial No. 539,453

6 Claims. (Cl. 340—347)

This invention relates to digital code decoding system for identifying and recording analog values represented by digital-code electrical signals.

Recording devices which function to provide a substantially continuous record or graph of the magnitude of a quantity represented by electrical signals must identify the electrical signals prior to making any record of the quantity represented. Electrical systems in which the signal is an analog of the magnitude of a quantity represented may use such a signal directly in various manners to displace an indicating element by an amount proportional to the signal, and thereby effect recognition of the value represented by the signal. The use of digital code signals to represent quantities, however, presents a more difficult problem, because digitally coded information appears in complex arrangements and is difficult to utilize directly. A decoding system is therefore required for manifesting values represented by digital coded signals.

The present invention contemplates a system for decoding, and recording the values of, digital codes. In the system, various combinations of current paths are sequentially provided, each of the combinations of current paths being identifiable with a different value of a digital code. A switching system is provided for interconnecting the current paths in accordance with the digital code value to be identified. The switching system and the current paths are than so arranged as to allow the formation of an indicating signal at a time when the combination of the current paths corresponds to the code value controlling the switching system. The sequential occurrence of the various combinations of current paths may then be synchronized with the scanning of a recording device such that upon recognition of a value of a digital code, the recording device will be actuated to record that particular value. In this manner, an essentially continuous record represented by successive values of the digital codes may be provided.

An object of the invention is to provide an improved decoding system.

Another object is to provide an improved decoding system for recording in graphical form the values represented by successive digital code signals.

Another object is to provide a digital decoder having a reduced number of electrical components.

Other and incidental objects of the invention will appear from the following description with reference to the drawings in which.

Figure 1:
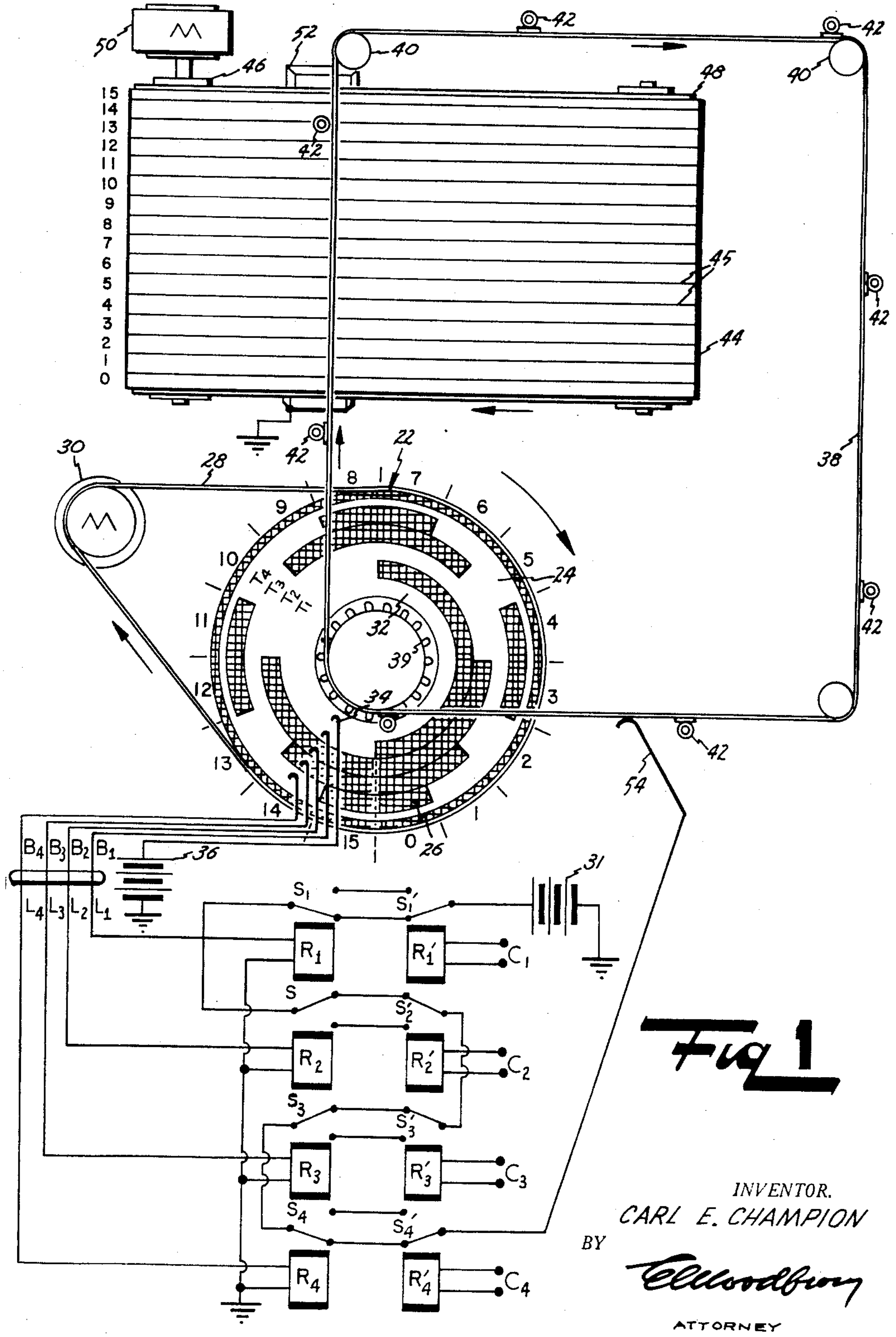
Figure 1 shows a schematic circuit and pictorial diagram of one system constructed in accordance with this invention.

Referring now to Figure 1, there is shown a coding disk 22 which has four annular tracks $T_1$, $T_2$, $T_3$ and $T_4$, which are formed of conducting and non-conducting segments, e.g., conducting segment 24 and non-conducting segment 26. The disk 22 is coupled by means of a belt 28 to a motor 30 in such a manner as to be revolved in a clockwise fashion. Brushes $B_1$, $B_2$, $B_3$, and $B_4$ contact the respective tracks $T_1$, $T_2$, $T_3$, and $T_4$. The coding disk 22 also has an annular track 32 which is not segmented, and is formed entirely of conducting material. A brush 34 serves to connect the track 32 to a battery 36 which is in turn connected to ground.

The brushes $B_1$, $B_2$, $B_3$ and $B_4$ are coupled by lines $L_1$, $L_2$, $L_3$ and $L_4$ respecively to relays $R_1$, $R_2$, $R_3$ and $R_4$.

The coding disk 22 is so constructed that all the conducting segments are electrically interconnected. Therefore, those of the brushes $B_1$, $B_2$, $B_3$ and $B_4$, which contact a conducting segment receive a current from the battery 36 through the brush 34, which flows over certain of the lines $L_1$, $L_2$, $L_3$ and $L_4$ to energize certain of the relays $R_1$, $R_2$, $R_3$ and $R_4$.

The segments of the coding disk 22 are so arranged as to form various binary code values detected by the brushes $B_1$, $B_2$, $B_3$ and $B_4$. The values of the code signals so formed will depend upon the angular position of the coding disk 22 with respect to the brushes $B_1$, $B_2$, $B_3$ and $B_4$. Scanning of various sectors of the coding disk 22 by the brushes $B_1$, $B_2$, $B_3$ and $B_4$, will cause different values of binary code signals to be formed. If a brush is so positioned as to receive a current, a "1" digit will be indicated, and if a brush is so positioned as to not carry a current, a "0" digit will be indicated.

The coding disk 22 is divided into 16 different code-indicating sectors, each of which is indicated in Figure 1. The binary and decimal values associated with each of the sectors are shown in the following table:

| Decimal value: | Binary code |
|---|---|
| 0 | 0000 |
| 1 | 0001 |
| 2 | 0011 |
| 3 | 0010 |
| 4 | 0110 |
| 5 | 0111 |
| 6 | 0101 |
| 7 | 0100 |
| 8 | 1100 |
| 9 | 1101 |
| 10 | 1111 |
| 11 | 1110 |
| 12 | 1010 |
| 13 | 1011 |
| 14 | 1001 |
| 15 | 1000 |

As an example of the manner of forming various code signals, consider a time when the coding disk 22 produces the binary code 0000, corresponding to the decimal value of 0. At this time, the disk will be angularly positioned in such a manner that the 0 sector lies under the brushes $B_1$–$B_4$. In this position, the brushes all contact non-conducting segments, and therefore no currents will be passed by the brushes $B_1$, $B_2$, $B_3$ and $B_4$, to the lines $L_1$, $L_2$, $L_3$ and $L_4$, indicating the binary code 0000.

Revolution of the disk 22 by the motor 30 causes different binary coded signal values to be sequentially set up in the lines $L_1$, $L_2$, $L_3$, and $L_4$, which in turn cause the relays $R_1$, $R_2$, $R_3$ and $R_4$, to be energized in various value-indicating combinations.

Associated respectively with the relays $R_1$, $R_2$, $R_3$ and $R_4$, are relays $R_1'$, $R_2'$, $R_3'$ and $R_4'$, selectively energized by binary signals to be decoded, which are applied to terminals $C_1$, $C_2$, $C_3$ and $C_4$.

The contacts of relays $R_1$, $R_2$, $R_3$ and $R_4$, and $R_1'$, $R_2'$, $R_3'$ and $R_4'$, are so interconnected that an electrical circuit will be closed by the contacts of any two associated relays either if both of the relays are energized or neither of the relays is energized. The four circuits are serially interconnected between a battery 31 and a brush 54, bearing on an endless conductive belt 38.

The belt 38 is trained over an insulated sprocket pulley 39 on the disc 22 and three insulated idler pulleys 40, and is driven in fixed phase relation to the disc 22 by the sprocket pulley 39. Attached to the belt 38 at discrete intervals are stylus devices 42. The spacing between successive stylus devices 42 on the belt 38 is equal to the circumference of the sprocket pulley 39 which drives the belt.

The belt 38 traverses the stylus devices 42 over a web of electro-sensitive record paper 44. The paper 44 may have lines 45 printed thereon which provide a scale of the data to be plotted. The web of paper 44 is mounted upon rollers 46 and 48. A motor 50 is mechanically coupled to the roller 46 to reel the paper from the roller 48 onto the roller 46.

A conductive grounded backing plate 52 is positioned behind the paper 44 and in electrical contact therewith.

Assume for purposes of illustration that the binary code 1001 is applied to the terminals $C_1$, $C_2$, $C_3$, and $C_4$, indicating, as may be seen from the above table, the decimal value 14. Under such conditions, the relay $R_1'$ will be energized, the relay $R_2'$ will be unenergized, the relay $R_3'$ will be unenergized and the relay $R_4'$ will be energized.

Consider now that the coding disk 22 is continuously rotating and causing various binary code values to be set up on the relays $R_1$, $R_2$, $R_3$ and $R_4$, as the various sectors of the disk 22 pass under the brushes $B_1$, $B_2$, $B_3$ and $B_4$. At a time when the coding disk 22 reaches the position shown in Figure 1, the sector identified with the value of 14 will be under the brushes $B_1$–$B_4$, and the brushes $B_1$ and $B_4$ will contact conducting segments of the tracks $T_1$ and $T_4$, whereas the brushes $B_2$ and $B_3$ will contact non-conducting segments in the tracks $T_2$ and $T_3$. Hence, the lines $L_1$ and $L_4$ will be connected to the battery 36 through the coding disk 22 to thereby energize the relays $R_1$ and $R_4$ and shift their movable contacts into lower position since the brushes $B_2$ and $B_3$ will contact non-conducting segments of the disk 22, the relays $R_2$ and $R_3$ will be unenergized, and their movable contacts will be in upper position.

At the instant when the coding disk 22 moves into the position shown in Figure 1, in which the fourteen-indicating sector is being sensed, an indicating means, i.e., one of the stylus devices 42 mounted upon the belt 38, will have scanned across the paper 44 to that one of the intervals between lines 45 indicating a value of fourteen. The positions of the relays $R_1$, $R_2$, $R_3$ and $R_4$, and $R_1'$, $R_2'$, $R_3'$ and $R_4'$, will, at this instant, be such as to allow the passage of a current from the battery 31 through the switches $S_1'$ and $S_1$, the switches $S_2'$ and $S_2$, the switches $S_3'$ and $S_3$, the switches $S_4'$ and $S_4$, the sliding contact 54, the belt 38, to a stylus device 42, thereby causing a potential difference to be applied across the paper 44 at the interval thereon assigned the value of fourteen. The paper 44, being of a type which upon the application of a voltage is marked, will be marked at the value of fourteen.

It is to be noted that although the described embodiment of the invention utilizes paper which is sensitive to electrical voltages, as a recording medium, ordinary paper could be substituted by using stylus devices comprising a pen, which would be urged against the paper 44 upon receiving an electrical signal.

From the above example, it may be seen that as the coding disk 22 revolves, the relays $R_1$, $R_2$, $R_3$ and $R_4$, will set their contacts $S_1$, $S_2$, $S_3$ and $S_4$, in different combinations, to prepare different paths of electrical conductivity. As the different combinations of current paths are provided, the stylus devices will in synchronism scan corresponding value-indicating intervals of the paper 44. The synchronism is maintained because the coding disk 22 controls the scanning of the paper 44 by the stylus devices 42. Thus with each revolution of the disk, the paper 44 will be scanned by one of the stylus devices 42, and a value will be recorded which corresponds to the value of the coded signal applied to the terminals $C_1$, $C_2$, $C_3$ and $C_4$. The code signals appearing at the terminals $C_1$, $C_2$, $C_3$ and $C_4$, will thus be decoded and plotted.

Figure 2:
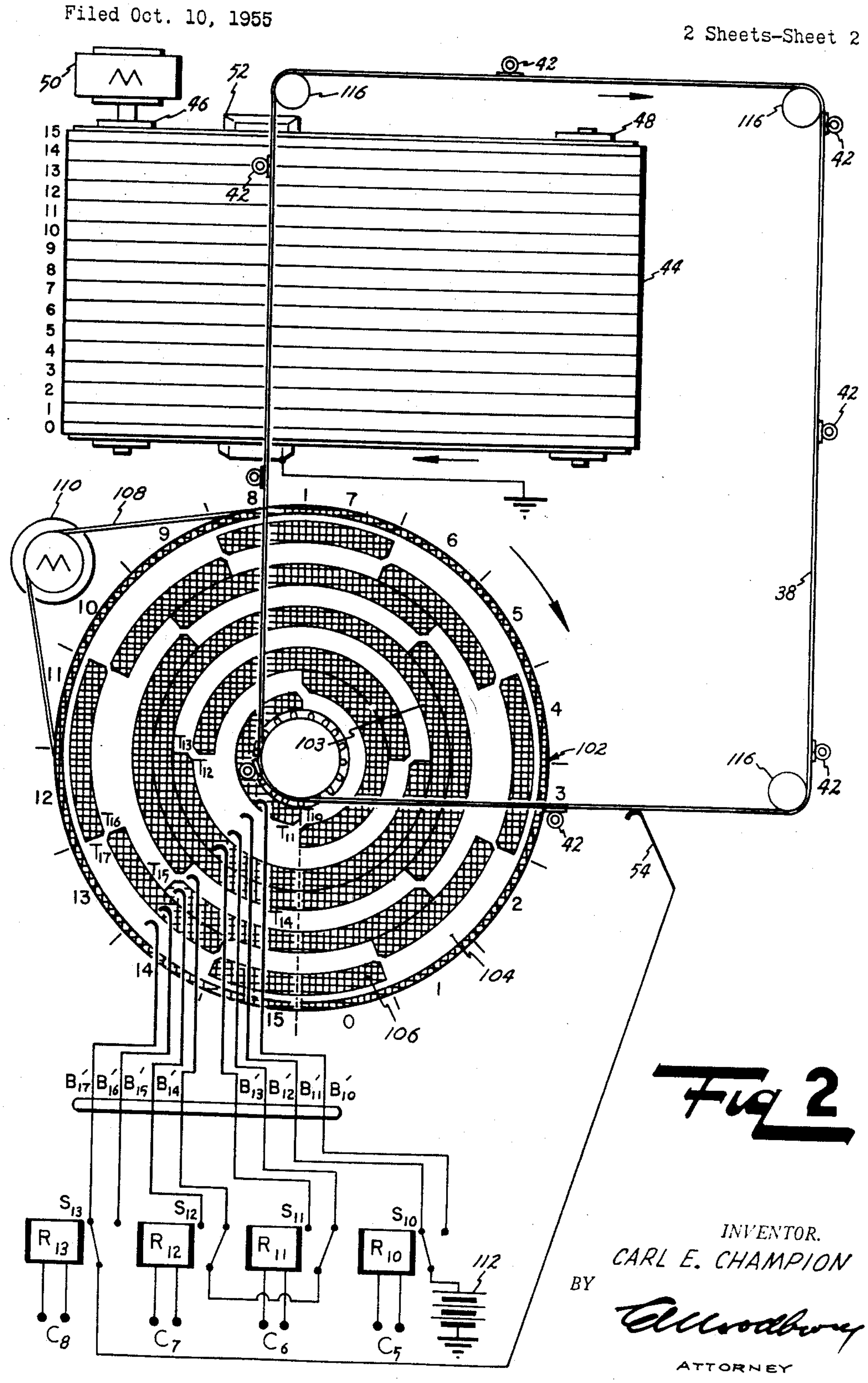
Figure 2 shows a schematic circuit and pictorial diagram of another system constructed in accordance with this invention.

Referring now to Figure 2, there is shown a coding disk 102 having a plurality of segmented tracks $T_{10}$–$T_{17}$. The coding disk 102 is structurally similar to the coding disk 22 shown in Figure 1 with conducting and non-conducting segments, e.g., conducting segment 104 and non-conducting segment 106. Associated with the annular tracks $T_{10}$–$T_{17}$ of the coding disk 102 are brushes $B_{10}'$–$B_{17}'$ respectively.

The tracks are related to each other in pairs, $T_{10}$–$T_{11}$; $T_{12}$ $T_{13}$; $T_{14}$ $T_{15}$; $T_{16}$ $T_{17}$, and the two tracks of each pair are invertedly segmented with respect to each other. The coding disk 102 is divided into 16 sectors as indicated, each of the sectors being identified with a particular value of binary code from zero to fifteen. In any sector, one of each pair of the annular tracks will always contain a conducting segment, and the other will contain a non-conducting segment. All the conductive segments of the four inner tracks $T_{10}$–$T_{13}$ are interconnected and all the conductive segments of the four outer tracks $T_{14}$–$T_{17}$ are interconnected but the segments of tracks $T_{10}$–$T_{13}$ are electrically insulated from the segments of tracks $T_{14}$–$T_{17}$ by a ring of insulation 103.

The coding disk 102 is mechanically connected by means of a belt 108 to a motor 110. As the motor rotates the coding disk, different sectors thereof pass under the brushes $B_{10}'$–$B_{17}'$ and different combinations of conductive paths, identified with the various binary code values, will be sequentially provided. As each new sector passes under the brushes $B_{10}'$–$B_{17}'$, a different current path will be provided by the conducting segments of the annular tracks, which path is identified with the value indicated for that sector of the coding disk 102.

The brushes $B_{10}'$–$B_{17}'$ are connected to the stationary contacts $S_{10}$–$S_{13}$ respectively of relays $R_{10}$–$R_{13}$, which are energized by digital signals applied to terminals $C_5$–$C_8$. The movable contact of the contacts $S_{10}$ is connected to a battery 112 which is in turn connected to ground.

The tracks of the coding disk 102 are so arranged that one set of alternate tracks forms a conventional binary coding disk. Each of the remaining tracks of the coding disk 102 is segmented oppositely to the track with which it is paired. One of the two brushes contacting any pair of tracks will, therefore, at any instant contact a conducting segment and the other brush will contact a non-conducting segment. The combination of two pairs of tracks, the segments of which are connected together, and their associated brushes is thus electrically analogous to the combination of two tracks and brushes and two single-pole double-throw relay contacts, the moving contacts of which are connected together as in the system of Figure 1. The two brushes of each pair of tracks are equivalent, functionally, to the stationary contacts of one of the relays $R_1$–$R_4$.

As in Figure 1, the coding disk 102 drives an endless conducting belt 38 carrying stylus devices 42 mounted upon it at equally spaced intervals, which stylus devices are traversely scanned over a web of paper 44 wound upon rollers 46 and 48 and driven by a motor 50 which is directly coupled to the roller 46.

The brush 54 contacting the belt 38 is connected to the movable contact of the relay $R_{13}$.

In the operation of the system shown in Figure 2, a four-digit binary code to be decoded is applied to the terminals $C_5$–$C_8$ and set up on the relays $R_{10}$–$R_{13}$. As the coding disk 102 is rotated, successive sectors thereof pass under the brushes $B_{10}'$–$B_{17}'$, and successive, different, conductive paths are created between various fixed contacts of the relays $R_{10}$–$R_{13}$. At a time when those paths set up by the coding disk 102 match the settings of the relays $R_{10}$–$R_{13}$, one of the stylus devices 42 will be positioned upon the paper web 44 at a point indicating the value held by the relays $R_5$–$R_8$ and will be energized by the current source 112 over a conductive path through the coding disk 102, and certain contacts of relays $R_{10}$–$R_{13}$ to thereby record the value of the binary code applied to terminals $C_5$–$C_8$.

Consider now in more detail the mode of operation of the system of Figure 2. In setting up various values of a four-digit binary code on the relays $R_{10}$–$R_{13}$, the most significant digit is applied to the relay $R_{10}$, and the relays $R_{11}$, $R_{12}$ and $R_{13}$ have applied thereto the less significant digits in descending order. The binary code used in the system of Figure 2 is that set out above in tabular form. For purposes of illustration, assume that the code for a decimal value of fourteen is set up on the relays $R_{10}$–$R_{13}$. The binary code for the decimal value of fourteen is 1001; therefore, the relays $R_{10}$–$R_{13}$ will be energized as shown while the relays $R_{11}$ and $R_{12}$ will be unenergized. During one interval of each revolution, the disk 102 will be in the position shown in Figure 2. At the instant the disk 102 assumes this position sector 14 thereof is sensed by the brushes $B_{10}'$–$B_{17}'$.

At this time, an electrical circuit is completed from the battery 112 through the switch $S_{10}$, through the brush $B_{11}'$, to a conducting segment in the track $T_{11}$. Because the conducting segments of the tracks $T_{10}$, $T_{11}$, $T_{12}$ and $T_{13}$ are all interconnected, the circuit is extended from the conductive segment in the track $T_{11}$ to a conducting segment in the track $T_{12}$, thence through the brush $B_{12}'$, the switch $S_{11}$, the switch $S_{12}$, and the brush $B_{14}'$ to a conducting segment of the track $T_{14}$. Since the conductive segments of the tracks $T_{14}$, $T_{15}$, $T_{16}$ and $T_{17}$ are interconnected, the circuit is extended from the track $T_{14}$ through the conductive segment of the track $T_{17}$, the brush $B_{17}'$, the switch $S_{13}$, and the brush 54 to the belt 38 thereby causing an indication to be made on the paper 120 at the point currently being scanned by a stylus device 42.

Summarizing, the disk 22 and relays $R_1$–$R_4$ in Figure 1, and the coding disk 102 in Figure 2, function to cyclically provide different conductive paths, each identified with a particular value of a binary code. Simultaneously with the variation of the conducting paths, corresponding different value-indicating intervals on the paper web 44 are scanned by the stylus devices 42. Hence, when the position of the disk is such that the current paths through it match or complement the paths created by the signal input relays, the value of the input signal is recorded.

It may therefore be seen that applicant has provided an improved decoding system which may be utilized to provide a substantially continuous record of the magnitude of a quantity represented by binary code signals.

Although for the purpose of explaining the invention a particular embodiment thereof has been shown and described, obvious modifications will occur to a person skilled in the art, and I do not desire to be limited to the exact details shown and described.

What is claimed is:

1. A decoding system comprising: cyclically operative switching means for sequentially providing different combinations of current paths, said combinations being identifiable with different values of a digital code; input switching means adapted to receive digital code signals, for interconnecting certain of said current paths in various serial arrangements in accordance with digital code signals received, said cyclically operative switching means and said input switching means being so arranged that certain of said current paths will be serially connected to pass an energizing signal at a time when the combination of said current paths identifies a digital code value corresponding to a digital code value received at said input switching means; indicating means synchronized with said cyclically operative switching means to sequentially assume various indicating positions indicative of different values of said digital code; and coupling means for passing said energizing signal from said cyclically operative switching means to said indicating means for causing a digital code value to be indicated by said indicating means.

2. A decodng system comprising: cyclically operative switching means for sequentially providing different combinations of current paths, said combinations each being identifiable with different values of a digital code; input switching means adapted to receive digital code signals for serially interconnecting certain of said current paths in various arrangements in accordance with digital code signals received; said cyclically operative switching means and said input switching means being so arranged that certain of said current paths will be serially connected to pass an energizing signal at a time when a combination of said current paths identifies a digital code value corresponding to a digital code value received at said input switching means; registering means; scanning means for causing said registering means to scan various value-indicating positions, said scanning means being synchronized with said cyclically operative switching means; and coupling means for passing said energizing signal from said cyclically operative switching means to said registering means such as to cause said registering means to register an indication of a particular digital code value at a time when the digital code value identified by said combination of current paths coincides with the digital code value received by said input switching means.

3. A device for recognizing the value of a digital code comprising: a plurality of mechanically interconnected segmented annular tracks, each of said tracks containing first and second type segments, each of said tracks being associated with another of said tracks such that certain pairs of said tracks are invertedly segmented; scanning means for scanning each of said tracks for sensing said first and said second type segments, various positions of said scanning means with respect to said tracks being associated with various values of said digital code; switching means for serially interconnecting different ones of said scanning means under control of said digital code, said tracks and said switching means being so arranged that upon said scanning means reaching a position of said annular tracks associated with a value of said digital code coinciding to the value of said digital code controlling said switching means, a recognition signal shall be formed.

4. A device according to claim 3 wherein said first and said second type segments comprise conducting and non-conducting segments.

5. A device for identifying a digital code value comprising: a plurality of pairs of mechanically-interconnected code-bearing annular tracks of conducting and non-conducting segments, each of said pairs of annular tracks having the conducting segments of one track angularly offset from the conducting segments of the other track such that one of said annular tracks of each pair of annular tracks will contain a conductive segment at all angular positions, couples of said pairs of annular tracks having all conducting segments therein electrically interconnected, brush means contacting each of said annular tracks, means for revolving said annular tracks relative to said brush means, and means for serially interconnecting certain of said brush means controlled by said digital code value such that at a certain point of said annular tracks with respect to said brush means a signal may pass through said brush means and said conducting segments to thereby identify said digital code value.

6. A device according to claim 5 including a scanning recorder device having movable indicating means; means for moving said indicating means in synchronism with said annular tracks in fixed phase relation thereto;

and means for activating said indicating means in response to said signal.

References Cited in the file of this patent

UNITED STATES PATENTS

| | | |
|---|---|---|
| 1,933,650 | Bascom | Nov. 7, 1933 |
| 2,533,242 | Gridley | Dec. 12, 1950 |
| 2,641,641 | Edgar | June 9, 1953 |
| 2,676,289 | Wulfsberg | Apr. 20, 1954 |
| 2,714,204 | Lippel | July 26, 1955 |